US008520156B2

(12) United States Patent
Park et al.

(10) Patent No.: US 8,520,156 B2
(45) Date of Patent: Aug. 27, 2013

(54) HIGH LIGHT TRANSMITTANCE IN-PLANE SWITCHING LIQUID CRYSTAL DISPLAY DEVICE

(75) Inventors: Seungryul Park, Goyang-si (KR); Soyoung Noh, Seoul (KR)

(73) Assignee: LG Display Co., Ltd., Seoul (KR)

( * ) Notice: Subject to any disclaimer, the term of this patent is extended or adjusted under 35 U.S.C. 154(b) by 35 days.

(21) Appl. No.: 13/274,003

(22) Filed: Oct. 14, 2011

(65) Prior Publication Data
US 2012/0099037 A1    Apr. 26, 2012

(30) Foreign Application Priority Data
Oct. 26, 2010    (KR) .......................... 10-2010-0104590

(51) Int. Cl.
*G02F 1/133*    (2006.01)

(52) U.S. Cl.
USPC .................. 349/33; 349/41; 349/42; 349/43; 349/46; 349/47

(58) Field of Classification Search
USPC .................. 349/19, 33, 41, 42, 43, 46, 47
See application file for complete search history.

(56) References Cited

U.S. PATENT DOCUMENTS

| 2006/0227273 | A1 | 10/2006 | Shin et al. |
| 2009/0174854 | A1 | 7/2009 | Park |
| 2011/0273650 | A1* | 11/2011 | Chae ............................ 349/108 |
| 2012/0104404 | A1* | 5/2012 | Kwack et al. .................. 257/72 |

FOREIGN PATENT DOCUMENTS

JP    2003-149664 A    5/2003

* cited by examiner

*Primary Examiner* — Jennifer Doan
(74) *Attorney, Agent, or Firm* — Birch, Stewart, Kolasch & Birch, LLP

(57) ABSTRACT

The present disclosure relates to a high light transmittance in-plane switching liquid crystal display device. The present disclosure suggests a horizontal electric field type liquid crystal display device comprising: a substrate; a plurality of gate lines disposed in horizontal direction on the substrate; a plurality of data lines disposed in vertical direction on the substrate; a plurality of pixel area defined by the crossing plurality of the gate lines and the plurality of the data lines; a first pixel electrode having a plurality of segments arraying with a predetermined distance within the pixel area; a second pixel electrode having a plurality of segments arraying in parallel with the first pixel electrode within the pixel area; and a common electrode overlapping with the first pixel electrode and the second electrode within the pixel area.

11 Claims, 3 Drawing Sheets

HIGH LIGHT TRANSMITTANCE IN-PLANE SWITCHING LIQUID CRYSTAL DISPLAY DEVICE

This application claims the benefit of Korea Patent Application No. 10-2010-0104590 filed on Oct. 26, 2010, which is incorporated herein by reference for all purposes as if fully set forth herein.

BACKGROUND OF THE INVENTION

1. Field of the Invention

The present disclosure relates to a high light transmittance in-plane switching liquid crystal display device. Especially, the present disclosure relates to a high light transmittance in-plane switching liquid crystal display device in which all problems shown in the horizontal electric field type liquid crystal display device, in which the pixel electrode and the common electrode are disposed in the same level plane, and the fringe filed type liquid crystal display device, in which the pixel electrode and the common electrode are overlapped, are solved.

2. Discussion of the Related Art

The liquid crystal display device (or "LCD") represents video data by controlling the light transmittance of the liquid crystal layer using the electric fields driven by thin film transistor (or "TFT"). According to the direction of the electric field, the LCD can be classified in the two major types; one is vertical electric field type and the other is the horizontal electric field type.

For the vertical electric field type LCD, the common electrode formed on the upper substrate and the pixel electrode formed on the lower substrate are facing with each other for forming the electric field of which direction is perpendicular to the substrate face. The twisted nematic (TN) liquid crystal layer disposed between the upper substrate and the lower substrate is driven the vertical electric field. The vertical electric field type LCD has merit of higher aperture ratio, while it has demerit of narrower view angle about 90 degree.

For the horizontal electric field type LCD, the common electrode and the pixel electrode are formed on the same substrate in parallel. The liquid crystal layer disposed between the upper substrate and the lower substrate is driven in In-Plane-Switching (IPS) mode by the electric field parallel to the substrate face. The horizontal electric field type LCD has a merit of wider view angle over 170 degrees and faster response speed than the vertical electric field type LCD.

However, for the case of the horizontal electric field type LCD in which the pixel electrode and the common electrode are disposed on the same level plane, even though the horizontal electric filed is formed between the pixel electrode and the common electrode, there is no electric field just over the pixel electrode and the common electrode. Therefore, the area occupied by the pixel electrode and the common electrode is to be the non-transmittance area at which the liquid crystal is not driven. Consequently, even the pixel electrode and the common electrode is made of a transparent material, they cannot contribute the transmittance area and then the aperture ratio will be reduced by their area.

In order to above mentioned problem, the fringe field type LCD is suggested in which the common electrode corresponding to most of all portions of the pixel area is formed at under layer, and the pixel electrode is formed upper layer by overlapping with the common electrode. In the fringe field type LCD, as the horizontal electric field is formed over the pixel electrode, the high aperture ratio can be ensured. However, the fringe field type LCD can ensure high aperture ratio at only small area LCDs. When the LCD size is larger, the parasitic capacitance formed between the common electrode and the pixel electrode is also increased. To solve this problem, the size of the transistor should be getting larger and the gap between the pixel electrodes will be narrower, so that the transmittance will be lowered.

SUMMARY OF THE INVENTION

In order to overcome the above mentioned drawbacks, the purpose of the present disclosure is to suggest a high light transmittance in-plane switching liquid crystal display device in which the horizontal electric field is formed at the space between the common electrode and the pixel electrode and the space over the pixel electrode and the common electrode. Other purpose of the present disclosure is to suggest a high light transmittance in-plane switching liquid crystal display device in which the parasitic capacitance formed between the common electrode and the pixel electrode is reduced when the horizontal electric field is formed by the fringe electric field type LCD.

In order to accomplish the above purpose, the present disclosure suggests a horizontal electric field type liquid crystal display device comprising: a substrate; a plurality of gate lines disposed in horizontal direction on the substrate; a plurality of data lines disposed in vertical direction on the substrate; a plurality of pixel area defined by the crossing the plurality of the gate lines and the plurality of the data lines; a first pixel electrode having a plurality of segments arraying with a predetermined distance within the pixel area; a second pixel electrode having a plurality of segments arraying in parallel with the first pixel electrode within the pixel area; and a common electrode overlapping with the first pixel electrode and the second electrode within the pixel area.

The first pixel electrode and the second pixel electrode are formed on the same level layer, and the common electrode is overlapping with the first pixel electrode and the second pixel electrode with having an insulating layer therebetween.

The common electrode has a width which is 2~3 times wider than any one width of the first pixel electrode and the second pixel electrode.

The first pixel electrode and the second pixel electrode are alternately disposed and being apart from each other with distance of 8 um~10 um.

The common electrode configured to be supplied with a voltage of which level is half of a maximum voltage difference between the pixel electrode and the second pixel electrode.

The first pixel electrode and the second pixel electrode are configured to have a voltage level difference having one value from 0V to 5V therebetween to form a horizontal electric field; and the common electrode, the first pixel electrode and the second pixel electrode are configured to have a voltage level difference having one value from 0V to 2.5V between the common electrode and the first pixel electrode and between the common electrode and the second pixel electrode to form a fringe field horizontal electric field.

The device further comprises a first thin film transistor formed at one corner of the pixel area and connected to the first pixel electrode; and a second thin film transistor formed at another corner of the pixel area and connected to the second pixel electrode.

The first thin film transistor is connected to a gate line disposed at one horizontal side of the pixel area and a first data line disposed at a first vertical side of the pixel area; and the second thin film transistor is connected to the gate line and a second data line disposed at a second vertical side of the pixel area.

The first thin film transistor includes a first gate electrode branched from the gate line, a first source electrode branched from the first data line, and a first drain electrode facing with the first source electrode; and the second thin film transistor includes a second gate electrode branched from the gate line, a second source electrode branched from the second data line, and a second drain electrode facing with the second source electrode.

The first thin film transistor is connected to a first gate line disposed at a first horizontal side of the pixel area, and a first data line disposed at a first vertical side of the pixel area; and the second thin film transistor is connected to a second gate line disposed at a second side of the pixel area, and a second data line disposed at a second vertical side of the pixel area.

The first thin film transistor includes a first gate electrode branched from the first gate line, a first source electrode branched from the first data line, and a first drain electrode facing with the first source electrode; and the second thin film transistor includes a second gate electrode branched from the second gate line, a second source electrode branched from the second data line, and a second drain electrode facing with the second source electrode.

The horizontal electric field type LCD according to the present disclosure includes a first pixel electrode and a second pixel electrode which are formed on the same level plane to form a first horizontal electric field between them, and a common electrode formed under the first and second pixel electrodes to form a second electric field between the pixel electrode and the common electrode. As the horizontal electric field is formed over the pixel electrode, the electrode area can be used as the liquid crystal driving area so high light transmittance is ensured. Furthermore, as the overlapping area of the common electrode and the pixel electrode to form the horizontal electric field over the pixel electrode can be minimized and the gap between the pixel electrodes is ensured to minimize the amount of the parasitic capacitance. That is, as the in-plane switching type LCD according to the present disclosure has the merits of the horizontal electric field type LCD and the fringe field type LCD and overcomes the demerits of them, the present disclosure can suggest a high light transmittance LCD having lower driving power consumption.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
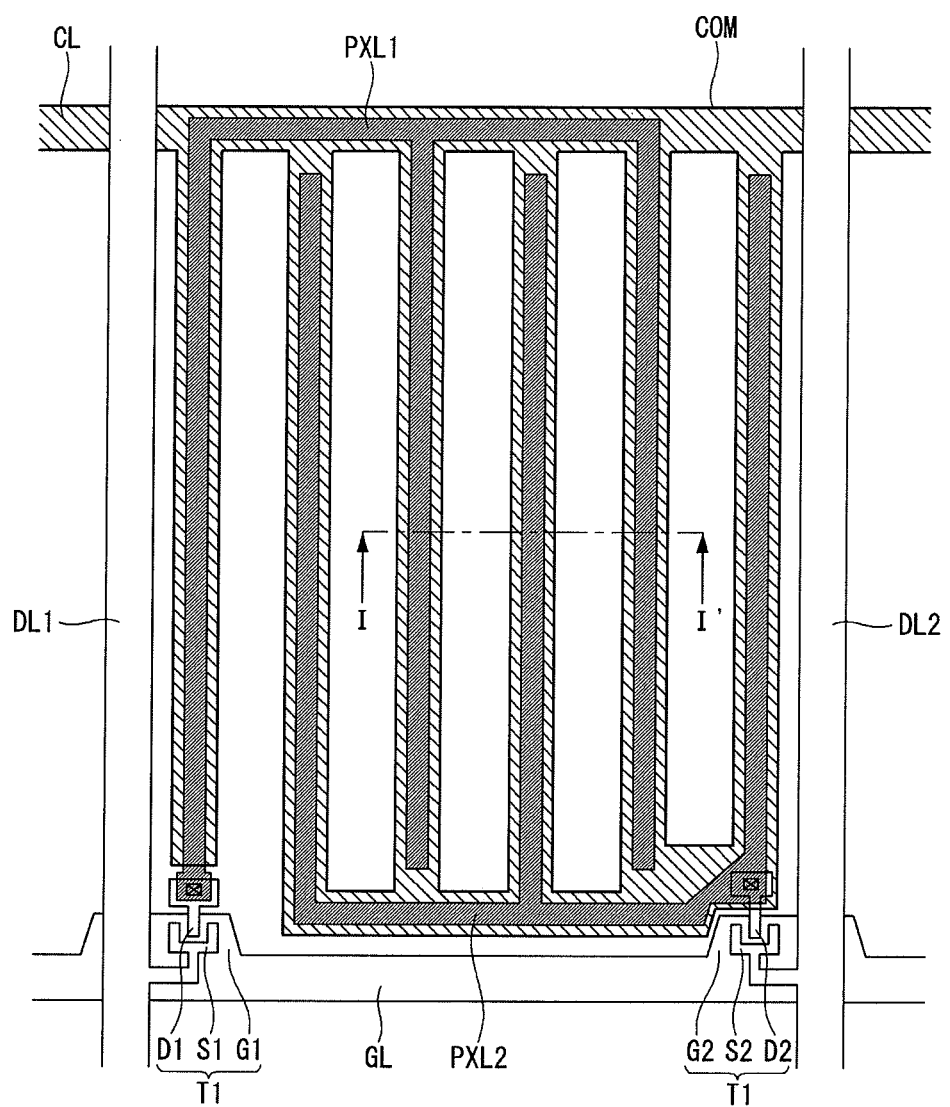
FIG. 1 is the plane view illustrating the structure of the high light transmittance in-plane switching liquid crystal display device according to the first embodiment of the present disclosure.
Figure 2:
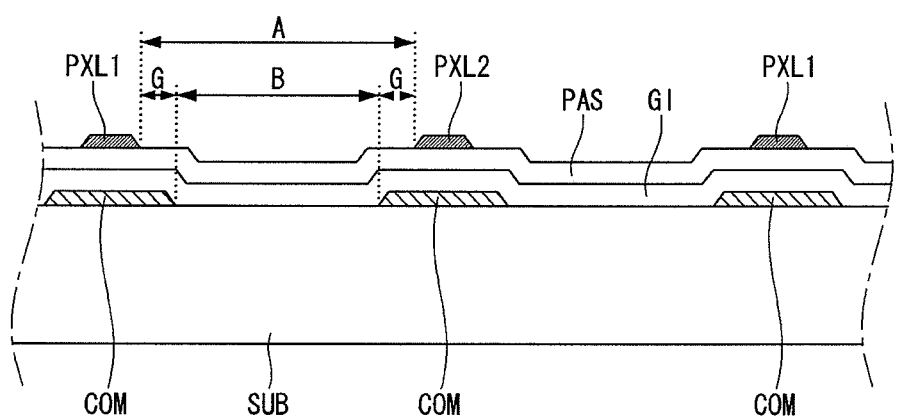
FIG. 2 is the cross-sectional view illustrating the structure of the high light transmittance in-plane switching liquid crystal display device according to the first embodiment by cutting along the line I-I'.

Hereinafter, referring to attached FIGS. 1 to 3, we will explain preferred embodiments of the present disclosure. FIG. 1 is the plane view illustrating the structure of the high light transmittance in-plane switching liquid crystal display device according to the first embodiment of the present disclosure. FIG. 2 is the cross-sectional view illustrating the structure of the high light transmittance in-plane switching liquid crystal display device according to the first embodiment by cutting along the line I-I'.

Referring to FIGS. 1 and 2, high light transmittance in-plane switching LCD includes a plurality of pixel areas defined by a plurality of gate lines running to the horizontal direction over a transparent substrate SUB and a plurality of data lines running to the vertical direction over the transparent substrate SUB which are crossing each other. A first thin film transistor T1 is disposed at one corner of each pixel area, and a second thin film transistor T2 is disposed the other corner of each pixel area. The first thin film transistor T1 is connected to a first pixel electrode PXL1 formed in the comb shape in which a plurality of segments are disposed with a first predetermined gap within the pixel area. The second thin film transistor T2 is also connected to a second pixel electrode PXL2 formed in the comb shape in which a plurality of segments are disposed with a second predetermined gap within the pixel area.

The first TFT T1 and the second TFT T2 are connected to the first gate electrode G1 and the second gate electrode G2 which are branched from the same gate line GL, respectively. The first source electrode S1 branched from the first data line DL1 is overlapped with one side of the first gate electrode G1. The first drain electrode D1 facing with the first source electrode S1 and being apart from the first source electrode S1 with a predetermined distance is overlapped with the other side of the first gate electrode G1. The first drain electrode D1 is connected to the first pixel electrode PXL1. Even though it is not shown in figures, the first semiconductor layer is disposed between the first gate electrode G1 and the first source-drain electrodes S1-D1 to play role of channel layer.

Furthermore, the second source electrode S2 branched from the second data line DL2 is overlapped with one side of the second gate electrode G2. The second drain electrode D2 facing with the second source electrode S2 and being apart from the second source electrode S2 with a predetermined distance is overlapped with the other side of the second gate electrode G2. The second drain electrode D2 is connected to the second pixel electrode PXL2. Even though it is not shown in figures, the second semiconductor layer is disposed between the second gate electrode G2 and the second source-drain electrodes S2-D2 to play role of channel layer.

The first pixel electrode PXL1 and the second pixel electrode PXL2 have a comb shape in which a plurality of segments are disposed with a predetermined distance between them. Furthermore, each segments of the first pixel electrode PXL1 and the second pixel electrode PXL2 are alternately disposed each other. That is, one segment of the first pixel electrode PXL1 and one segment of the second pixel electrode PXL2 are closely disposed on the same level plane to form a horizontal electric field therebetween.

When a scan signal is supplied to a gate line GL, the first TFT T1 and the second TFT T2 turn on at the same time, and then the pixel signal is supplied to the first pixel electrode PXL1 and the second pixel electrode PXL2 at the same time. In order to form a horizontal electric field between the first pixel electrode PXL1 and the second pixel electrode PXL2, they should have different voltage levels. For example, the first pixel electrode PXL1 preferably has the voltage range changing from 0V to 5V, while the second pixel electrode PXL2 preferably has the voltage range changing from 5V to 0V, so that the voltage level different can be any one of from 0V to 5V. Consequently, it is possible to drive the liquid crystal molecules with the horizontal electric filed formed between the first pixel electrode PXL1 and the second pixel electrode PXL2, and to represent the video data.

With this structure, especially when the distance between the first pixel electrode PXL1 and the second pixel electrode PXL2 is almost three times of the width of the pixel electrodes themselves PXL1 and PXL2, the horizontal electric field is formed at the space between the pixel electrodes PXL1 and PXL2, but there is no horizontal electric field just over the pixel electrodes themselves PXL1 and PXL2. Therefore, the liquid crystal molecules disposed over the pixel electrodes PXL1 and PXL2 cannot be driven. It is more preferable to make that the horizontal electric field is formed over the pixel electrodes themselves PXL1 and PXL2.

To do so, in the first embodiment of the present disclosure, a common electrode COM is further included which is disposed under the pixel electrodes PXL1 and PXL2 to be overlapped with them and has a wider width than the pixel electrodes PXL1 and PXL2. For example, the common electrode COM can be formed on the same level layer with the gate line GL and the gate electrodes G1 and G2, and made of a transparent conductive material. Furthermore, a common line CL can be disposed parallel with the gate line GL for supplying the common voltage to the common electrode COM. The common electrode COM and the pixel electrodes PXL1 and PXL2 are overlapped each other with having the gate insulating layer GI and the passivation layer PAS therebetween.

Referring to FIG. 2 again, more detailed structure is explained hereinafter. In order that the horizontal eclectic field is formed over the pixel electrodes themselves PXL1 and PXL2, it is preferable that the common electrode COM has wider width than those of pixel electrodes PXL1 and PXL2. As a result, a fringe field is formed between the surfaces of the pixel electrodes PXL1 and PXL2 and the edge of the common electrode COM. Due to this fringe field, the horizontal electric filed can be formed over the pixel electrodes PXL1 and PXL2. The width of the common electrode COM is preferably 2-3 times of the width of the pixel electrodes PXL1 and PXL2. In other words, the edge of the common electrode COM is preferably protruded from the edges of the pixel electrodes PXL1 and PXL2 with a length which is ½~¾ times of the width of the pixel electrodes PXL1 and PXL2. That is, it is preferable that the overlapped gap G of the common electrode COM and the pixel electrode PXL1 and PXL2 is ½~¾ times of the width of the pixel electrodes PXL1 and PXL2.

In addition, when the horizontal electric field due to the fringe field is formed between the common electrode COM and the pixel electrodes PXL1 and PXL2, the strength of the fringe field can be decided by considering the horizontal electric field formed between the first pixel electrode PXL1 and the second pixel electrode PXL2. For example, the common electrode COM can be supplied with the 2.5V level which is the middle level of the maximum difference voltage level between the first pixel electrode PXL1 and the second pixel electrode PXL2.

The strength of the horizontal electric field formed between the first pixel electrode PXL1 and the second pixel electrode PXL2 is defined by the voltage difference between the voltage level of the first pixel electrode PXL1 and the voltage level of the second pixel electrode PXL2. That is, the voltage difference between the first pixel electrode PXL1 and the second pixel electrode PXL2 is any one value from 0V to 5V. As the common electrode has the constant voltage level of 2.5V, the fringe field having the voltage difference of any one from 0V to 2.5V is formed between the common electrode COM and the pixel electrodes PXL1 and PXL2.

Consequently, in the liquid crystal display device according to the first embodiment of the present disclosure, the horizontal electric field is formed overall of the pixel area. Therefore, it is possible for the present disclosure to suggest a high light transmittance in-plane switching liquid crystal display device in which most of all area of the pixel region can be used as the light transmittance area.

Hereinafter, referring to FIG. 3, the second embodiment of the present disclosure will be explained. FIG. 3 is the plane view illustrating the structure of the high light transmittance in-plane switching liquid crystal display device according to the second embodiment of the present disclosure. The cross sectional structure of the horizontal electric field type LCD according to the second embodiment is very similar with that of the first embodiment. The difference is just on the arraying of the first TFT T1 and the second TFT T2.

Figure 3:
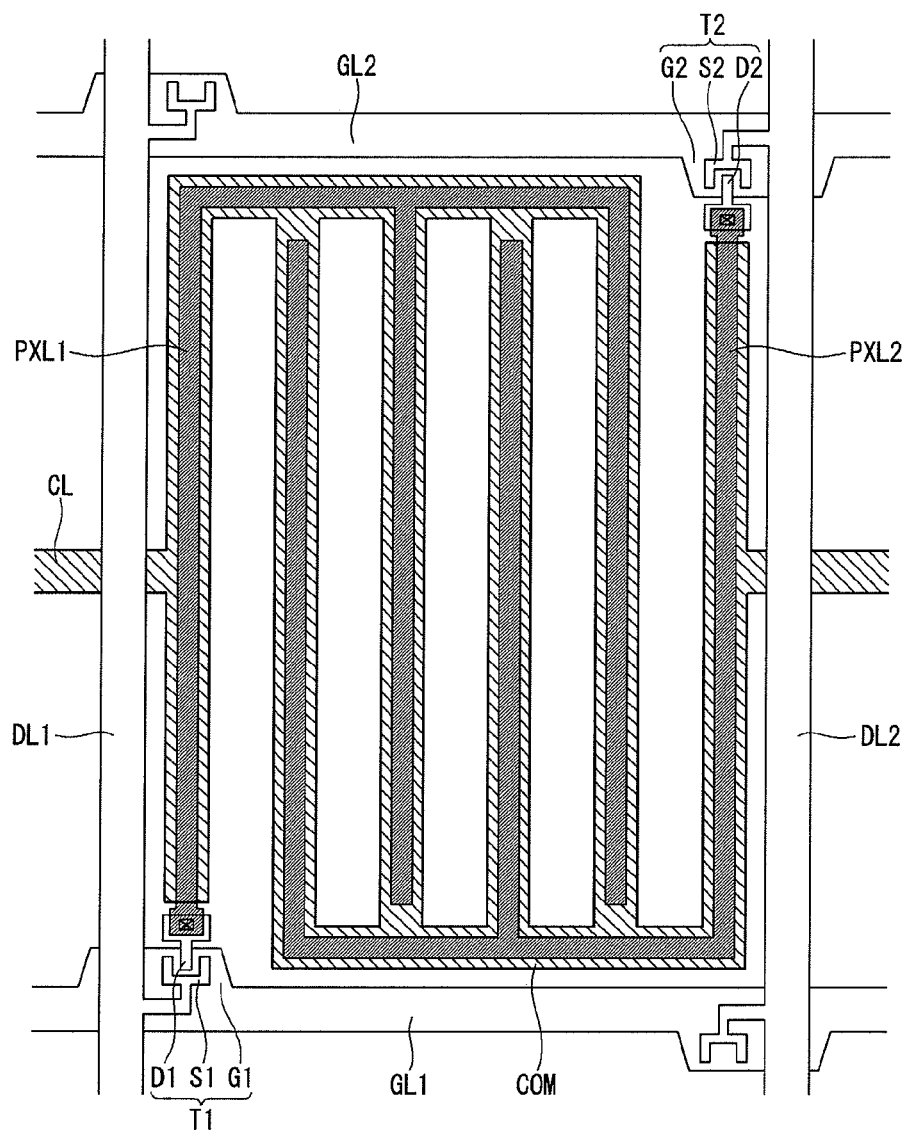
FIG. 3 is the plane view illustrating the structure of the high light transmittance in-plane switching liquid crystal display device according to the second embodiment of the present disclosure.

Referring to FIG. 3, the high light transmittance in-plane switching liquid crystal display device according to the second embodiment comprises a plurality of pixel area defined by the crossing structure of a plurality of gate lines running to the horizontal direction on a transparent substrate SUB and a plurality of data lines running to the vertical direction on the transparent substrate SUB. A first TFT T1 is disposed at one corner of the pixel area, and a second TFT T2 is disposed at another corner of the pixel area. The first TFT T1 is connected to a first pixel electrode PXL1 formed as a comb shape in the pixel area. The second TFT T2 is connected to a second pixel electrode PXL2 formed as a comb shape in the pixel area.

The first TFT T1 is connected to a first gate electrode G1 branched from a first gate line GL1, and the second TFT T2 is connected to a second gate electrode G2 branched from a second gate line GL2. In addition, a first source electrode S1 branched from a first data line DL1 is overlapped with one side of the first gate electrode G1. A first drain electrode D1 facing with the first source electrode S1 and being apart from the first source electrode S1 with a predetermined distance is overlapped with the other side of the first gate electrode G1. The first drain electrode D1 is connected to the first pixel electrode PXL1. Even though it is not shown in figures, a first semiconductor layer is disposed between the first gate electrode G1 and the first source-drain electrodes S1-D1, to play a role of channel.

Furthermore, the second source electrode S2 branched from the second data line DL2 is overlapped with one side of the second gate electrode G2. The second drain electrode D2 facing with the second source electrode S2 and being apart from the second source electrode S2 with a predetermined distance is overlapped with the other side of the second gate electrode G2. The second drain electrode D2 is connected to the second pixel electrode PXL2. Even though it is not shown in figures, the second semiconductor layer is disposed between the second gate electrode G2 and the second source-drain electrodes S2-D2 to play role of channel layer.

The first pixel electrode PXL1 and the second pixel electrode PXL2 have a comb shape in which a plurality of segments are disposed with a predetermined distance between them. Furthermore, each segments of the first pixel electrode PXL1 and the second pixel electrode PXL2 are alternately disposed each other. That is, one segment of the first pixel electrode PXL1 and one segment of the second pixel electrode PXL2 are closely disposed on the same level plane to form a horizontal electric field therebetween.

In the second embodiment, the first TFT T1 turns on when the first gate line GL1 is selected, and the second TFT T2 turns on when the second gate line GL2 is selected previously on the first gate line GL1. Therefore, there is time delay between when the first pixel electrode PXL1 is charged and when the second pixel electrode PXL2 is charged. However, during one picture frame is represented, the charged voltages to each pixel electrodes PXL1 and PXL2 are maintained, so that a horizontal electric field between the pixel electrodes PXL1 and PXL2 is formed.

As explained above, the difference between the first embodiment and the second embodiment is on the arraying structure of the thin film transistors T1 and T2 for forming the horizontal electric field between the pixel electrodes PXL1 and PXL2, but there is no difference on the arraying structure of the commune electrode COM and the pixel electrodes PXL1 and PXL2. In the present disclosure, the main electric field for driving the liquid crystal molecules is the horizontal electric field formed between the first pixel electrode PXL1 and the second pixel electrode PXL2. The horizontal electric field due to the fringe field formed between the common electrode COM and the pixel electrodes PXL1 and PXL2 contributes to drive the liquid crystal molecules disposed over the pixel electrodes themselves PXL1 and PXL2. Consequently, according to the present disclosure, the horizontal electric field is formed overall pixel area including the space just over the pixel electrodes PXL1 and PXL2.

Furthermore, the horizontal electric field due to the fringe field does make effect on the common electrode COM disposed just under its pixel electrode not on the neighboring common electrode COM. Therefore, there is a merit that it is possible to reduce the parasitic capacitance between the pixel electrode and the common electrode.

In addition, in the pixel area, as two pixel electrodes are driving using two thin film transistors, it is possible to make the driving voltage be lower. In other words, with the same driving voltage, it is possible to design the pixel electrodes to be disposed with longer distance. For example, the gap (A) between the pixel electrodes PXL1 and PXL2 can be 8~10 um which is longer than 7 um used in conventional one. Actually, when the widths of the first pixel electrode PXL1 and the second pixel electrode PXL2 would be 2 um, the gap between the pixel electrodes PXL1 and PXL2 would be 10 um, the width of the common electrode COM would be 4 um, and the gap between the common electrodes COM would be 8 um, the light transmittance can be increased at least 20%. Here, the gap (B) between the common electrodes COM is defined by the gap (A) between the pixel electrodes PXL1 and PXL2 and the overlapped area (G) between the common electrode COM and the pixel electrodes PXL1 and PXL2.

While the embodiment of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. A horizontal electric field type liquid crystal display device comprising:
    a substrate;
    a plurality of gate lines disposed in horizontal direction on the substrate;
    a plurality of data lines disposed in vertical direction on the substrate;
    a plurality of pixel area defined by the crossing the plurality of the gate lines and the plurality of the data lines;
    a first pixel electrode having a plurality of segments arraying with a predetermined distance within the pixel area;
    a second pixel electrode having a plurality of segments arraying in parallel with the first pixel electrode within the pixel area; and
    a common electrode having a plurality of segments corresponding to the segments of the first pixel electrode and the second pixel electrode,
    wherein each segment of the common electrode overlaps with the respective segments of the first pixel electrode and the second pixel electrode within the pixel area, and
    wherein each segment of the common electrode has a width wider than a width of each segment of the first pixel electrode and the second pixel electrode.

2. The device according to the claim 1, wherein the first pixel electrode and the second pixel electrode are formed on the same level layer, and the common electrode is overlapping with the first pixel electrode and the second pixel electrode with having an insulating layer therebetween.

3. The device according to the claim 1, wherein the width of the segments of the common electrode is 2~3 times wider than any one width of the segment of the first pixel electrode and the second pixel electrode.

4. The device according to the claim 1, wherein the first pixel electrode and the second pixel electrode are alternately disposed and being apart from each other with distance of 8 um ~10 um.

5. The device according to the claim 1, wherein the common electrode configured to be supplied with a voltage of which level is half of a maximum voltage difference between the first pixel electrode and the second pixel electrode.

6. The device according to the claim 5, wherein the first pixel electrode and the second pixel electrode are configured to have a voltage level difference having one value from 0V to 5V therebetween to form a horizontal electric field; and
    wherein the common electrode, the first pixel electrode and the second pixel electrode are configured to have a voltage level difference having one value from 0V to 2.5V between the common electrode and the first pixel electrode and between the common electrode and the second pixel electrode to form a fringe field horizontal electric field.

7. The device according to the claim 1, further comprising:
    a first thin film transistor formed at one corner of the pixel area and connected to the first pixel electrode; and
    a second thin film transistor formed at another corner of the pixel area and connected to the second pixel electrode.

8. The device according to the claim 7, wherein the first thin film transistor is connected to a gate line disposed at one horizontal side of the pixel area and a first data line disposed at a first vertical side of the pixel area; and
    wherein the second thin film transistor is connected to the gate line and a second data line disposed at a second vertical side of the pixel area.

9. The device according to the claim 8, wherein the first thin film transistor includes a first gate electrode branched from the gate line, a first source electrode branched from the first data line, and a first drain electrode facing with the first source electrode; and wherein the second thin film transistor includes a second gate electrode branched from the gate line, a second source electrode branched from the second data line, and a second drain electrode facing with the second source electrode.

10. The device according to the claim 7, wherein the first thin film transistor is connected to a first gate line disposed at a first horizontal side of the pixel area, and a first data line disposed at a first vertical side of the pixel area; and wherein the second thin film transistor is connected to a second gate line disposed at a second side of the pixel area, and a second data line disposed at a second vertical side of the pixel area.

11. The device according to the claim 10, wherein the first thin film transistor includes a first gate electrode branched from the first gate line, a first source electrode branched from the first data line, and a first drain electrode facing with the first source electrode; and wherein the second thin film transistor includes a second gate electrode branched from the second gate line, a second source electrode branched from the second data line, and a second drain electrode facing with the second source electrode.

* * * * *